United States Patent
Soma et al.

(10) Patent No.: US 8,006,788 B2
(45) Date of Patent: Aug. 30, 2011

(54) MAXIMUM OUTPUT SETTING DEVICE, DRIVING DEVICE INCLUDING THE MAXIMUM OUTPUT SETTING DEVICE, POWER OUTPUT APPARATUS INCLUDING THE DRIVING DEVICE, MOTOR VEHICLE MOUNTED WITH THE POWER OUTPUT APPARATUS, AND MAXIMUM OUTPUT SETTING METHOD

(75) Inventors: Takaya Soma, Toyota (JP); Hiroshi Yoshida, Anjyo (JP); Takeshi Mogari, Nagoya (JP); Takahiro Suzuki, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 775 days.

(21) Appl. No.: 11/887,617

(22) PCT Filed: Aug. 1, 2006

(86) PCT No.: PCT/JP2006/315194
§ 371 (c)(1),
(2), (4) Date: Oct. 2, 2007

(87) PCT Pub. No.: WO2007/018073
PCT Pub. Date: Feb. 15, 2007

(65) Prior Publication Data
US 2009/0266630 A1    Oct. 29, 2009

(30) Foreign Application Priority Data
Aug. 9, 2005    (JP) .................... 2005-230775

(51) Int. Cl.
B60W 10/24    (2006.01)
(52) U.S. Cl. .................... 180/65.29
(58) Field of Classification Search ............... 180/65.21, 180/65.265, 65.29; 320/166
See application file for complete search history.

(56) References Cited

U.S. PATENT DOCUMENTS

| 6,691,810 B2 | 2/2004 | Hasuka et al. | |
| 7,012,389 B2* | 3/2006 | Kobayashi et al. | 318/400.02 |
| 7,108,088 B2* | 9/2006 | Muta | 180/65.235 |
| 2006/0087291 A1* | 4/2006 | Yamauchi | 320/137 |

FOREIGN PATENT DOCUMENTS

| JP | A 2003-061212 | 2/2003 |
| JP | A 2003-346919 | 12/2003 |

* cited by examiner

*Primary Examiner* — Jeffrey J Restifo
*Assistant Examiner* — Erez Gurari
(74) *Attorney, Agent, or Firm* — Oliff & Berridge, PLC (57) ABSTRACT

A maximum current Imax is calculated on the basis of an open-circuit voltage Voc, a lower limit voltage Vcapmin, and an internal resistance Rcap of a capacitor and a first maximum output Wcouttmp1 is calculated on the basis of the maximum current Imax and the lower limit voltage Vcapmin. A second maximum output Wcouttmp2 is calculated on the basis of the open-circuit voltage Voc and an open-circuit lower limit voltage Vocmin. A third maximum output Wcouttmp3 is calculated on the basis of a capacitor voltage Vcap and the lower limit voltage Vcapmin. A smallest value among the calculated three maximum outputs is set as an execution maximum output Wcout of the capacitor. A motor is controlled to be driven in a range of this execution maximum output Wcout.

8 Claims, 8 Drawing Sheets

MAXIMUM OUTPUT SETTING DEVICE, DRIVING DEVICE INCLUDING THE MAXIMUM OUTPUT SETTING DEVICE, POWER OUTPUT APPARATUS INCLUDING THE DRIVING DEVICE, MOTOR VEHICLE MOUNTED WITH THE POWER OUTPUT APPARATUS, AND MAXIMUM OUTPUT SETTING METHOD

TECHNICAL FIELD

The present invention relates to a maximum output setting device, a driving device including the maximum output setting device, a power output apparatus including the driving device, a motor vehicle mounted with the power output apparatus, and a maximum output setting method. More specifically, the present invention relates to a maximum output setting device that sets a maximum output of a capacitor, a driving device including the maximum output setting device, a power output apparatus including the driving device, a motor vehicle mounted with the power output apparatus, and a maximum output setting method of setting a maximum output of the capacitor.

BACKGROUND ART

As a maximum output setting device of this type, a maximum output setting device that sets a maximum output of a capacitor on the basis of an open-circuit voltage, a lower limit voltage, and an internal resistance of the capacitor has been proposed (see, for example, Patent Document 1). A driving device including a motor that is capable of inputting power to and outputting power from a drive shaft, a capacitor that exchanges electric power with the motor, and the maximum output setting device drives the motor using the electric power outputted from the capacitor in a range of a maximum output of the capacitor set by the maximum output setting device to thereby control output of excessive electric power from the capacitor.
[Patent Document 1] Japanese Patent Laid-Open No. 2003-346919

DISCLOSURE OF THE INVENTION

As described above, in a device that uses a capacitor, control of output of excessive electric power from the capacitor is considered to be one of problems that should be solved. It is desired to more properly calculate and set a maximum output of the capacitor. Therefore, it is preferable not only to set a maximum output on the basis of a maximum output of the capacitor calculated from an open-circuit voltage, a lower limit voltage, and an internal resistance as described above but also to take into account a maximum output of the capacitor calculated by other methods.

It is an object of a maximum output setting device, a driving device including the maximum output setting device, a power output apparatus including the driving device, a motor vehicle mounted with the power output apparatus, and a maximum output setting method of the present invention to more properly set an execution maximum output of a capacitor. It is another object of the driving device, the power output apparatus including the driving device, and the motor vehicle mounted with the power output apparatus of the present invention to prevent excessive electric power from being outputted from the capacitor.

In order to attain at least part of the above and the other related objects, the maximum output setting device, the driving device including the maximum output setting device, the power output apparatus including the driving device, the motor vehicle mounted with the power output apparatus, and the maximum output setting method of the invention have the configurations and the arrangements discussed below.

The present invention is directed to a maximum output setting device that sets a maximum output of a capacitor. The maximum output setting device includes: a state detecting unit that detects a state of the capacitor including a voltage, an electric current, and temperature of the capacitor; a voltage-resistance calculating unit that calculates an open-circuit voltage and an internal resistance of the capacitor on the basis of at least the voltage, the electric current, and the temperature included in the state of the capacitor detected; a maximum-output calculating unit that calculates at least two maximum outputs among plural maximum outputs including a maximum output due to a maximum current, which can be outputted from the capacitor, calculated on the basis of an allowable maximum current of the capacitor from the open-circuit voltage and the internal resistance calculated and an allowable lower limit voltage of the capacitor, a maximum output due to an open-circuit voltage, which can be outputted from the capacitor, calculated on the basis of the open-circuit voltage calculated and an open-circuit lower limit voltage applied to the capacitor, and a maximum output due to a capacitor voltage, which can be outputted from the capacitor, calculated on the basis of the voltage of the capacitor detected and the allowable lower limit voltage of the capacitor; and an execution maximum output setting unit that sets a smallest maximum output of the calculated at least two maximum outputs as an execution maximum output of the capacitor.

The maximum output setting device of the present invention calculates at least two maximum outputs among plural maximum outputs including a maximum output due to a maximum current, which can be outputted from the capacitor, calculated on the basis of an allowable maximum current of the capacitor from an open-circuit voltage, an internal resistance, and an allowable lower limit voltage of the capacitor set on the basis of at least a voltage, an electric current, and a temperature included in a state of the capacitor, a maximum output due to an open-circuit voltage, which can be outputted from the capacitor, calculated on the basis of the open-circuit voltage of the capacitor and an open-circuit lower limit voltage applied to the capacitor, and a maximum output due to a capacitor voltage, which can be outputted from the capacitor, calculated on the basis of the voltage and the allowable lower limit voltage of the capacitor. The maximum output setting device sets a smallest maximum output of the calculated at least two maximum outputs as an execution maximum output of the capacitor. In other words, the maximum output setting device calculates at least two maximum outputs among plural maximum outputs including a maximum output due to a maximum current, a maximum output due to an open-circuit voltage, and a maximum output due to a capacitor voltage and sets a smallest maximum output of the calculated at least two maximum outputs as an execution maximum output of the capacitor. This makes it possible to more properly set the execution maximum output of the capacitor.

In one preferable embodiment of the maximum output setting device of the present invention, the maximum-output calculating unit is a unit that performs at least two calculations among plural calculations of a maximum output including a calculation for setting an electric current obtained by dividing a difference between the calculated open-circuit voltage and the allowable lower limit voltage by the calculated internal resistance as the maximum current and setting an output calculated by multiplying the maximum current with the allowable lower limit voltage as the maximum output due to a maximum current, a calculation for setting an output calculated by dividing a difference between a square of the calculated open-circuit voltage and a square of the open-circuit lower limit voltage by the calculated internal resistance as the maximum output due to an open-circuit voltage, and a calculation for setting an output calculated by dividing a difference between a square of the detected voltage of the capacitor and a square of the allowable lower limit voltage by the calculated internal resistance as the maximum output due to the capacitor voltage. This makes it possible to more properly calculate the maximum output due to a maximum current, the maximum output due to an open-circuit voltage, and the maximum output due to a capacitor voltage.

In another preferable embodiment of the maximum output setting device of the present invention, the voltage-resistance calculating unit is a unit that sets the internal resistance of the capacitor to be smaller as the detected temperature of the capacitor is higher and calculates the open-circuit voltage of the capacitor on the basis of the internal resistance set and the detected voltage and electric current of the capacitor. This makes it possible to more properly set the internal resistance and the open-circuit voltage of the capacitor.

The present invention is also directed to a driving device that drives a drive shaft. The driving device includes: a motor that is capable of inputting power to and outputting power from the drive shaft; a capacitor that is capable of exchanging electric power with the motor; an accumulator unit that is capable of exchanging electric power with the motor and is connected in parallel to the capacitor with respect to the motor; a maximum output setting device according to any one of the aspects of the present invention discussed above that sets the maximum output of the capacitor; a driving-power-demand setting unit that sets a driving power demand required of the drive shaft; and a control unit that controls the motor such that a driving force based on the driving power demand set is outputted to the drive shaft and is outputted from the capacitor in a range of the execution maximum output of the capacitor set.

The driving device of the present invention includes the maximum output setting device according to any one of the aspects of the present invention described above. Therefore, it is possible to exert the same effects to those of the maximum output setting device of the present invention, for example, the effect that it is possible to more properly set an execution maximum output of the capacitor. Moreover, the driving device controls a motor such that electric power is outputted from the capacitor in the range of the execution maximum output of the capacitor set by the maximum output setting device. Therefore, it is possible to prevent excessive electric power from being outputted from the capacitor. It goes without saying that it is possible to output a driving force to a drive shaft based on a driving force demand required by the drive shaft.

The power output apparatus of the present invention is a power output apparatus that outputs power to a drive shaft. The power output apparatus includes an internal combustion engine capable of outputting power to the drive shaft and the driving device of the present invention described above. The control unit is a unit for controlling the internal combustion engine and the motor. Since the power output apparatus of the present invention described above includes the driving device of the invention, it is possible to exert the same effects to those of the driving device of the present invention. For example, the effect that it is possible to more properly set an execution maximum output of the capacitor and the effect that it is possible to prevent excessive electric power from being outputted from the capacitor.

In one preferable embodiment of the power output apparatus of the present invention, the power output apparatus further includes: a three shaft-type power input output module that is connected to three shafts including an output shaft of the internal combustion engine, the drive shaft, and a rotating shaft and inputs power in and outputs power from the remaining shaft on the basis of power inputted to and outputted from any two shafts of the three shafts; and a generator that inputs power in and outputs power from the rotating shaft. The capacitor may be a capacitor that is capable of exchanging electric power with the generator and the motor, the accumulator unit may be a unit that is capable of exchanging electric power with the generator and the motor and is connected in parallel to the capacitor with respect to the generator and the motor, and the control unit may be a unit that controls the internal combustion engine, the generator, and the motor.

The present invention is also directed to a motor vehicle that is mounted with the power output apparatus having any of the arrangements described above, and an axle is coupled to the drive shaft. The motor vehicle of the present invention is mounted with the power output apparatus having any of the arrangements described above and accordingly exerts the similar effects to those of the power output apparatus of the invention. For example, the effect that it is possible to more properly set an execution maximum output of the capacitor and the effect that it is possible to prevent excessive electric power from being outputted from the capacitor.

The present invention is also directed to a maximum output setting method of setting a maximum output of a capacitor. The maximum output setting method including the steps of: (a) calculating an open-circuit voltage and an internal resistance of the capacitor on the basis of at least a voltage, an electric current, and temperature included in a state of the capacitor; (b) calculating at least two maximum outputs among plural maximum outputs including a maximum output due to a maximum current, which can be outputted from the capacitor, calculated on the basis of an allowable maximum current of the capacitor from the open-circuit voltage and the internal resistance calculated and an allowable lower limit voltage of the capacitor, a maximum output due to an open-circuit voltage, which can be outputted from the capacitor, calculated on the basis of the open-circuit voltage calculated and an open-circuit lower limit voltage applied to the capacitor, and a maximum output due to a capacitor voltage, which can be outputted from the capacitor, calculated on the basis of the voltage of the capacitor and the allowable lower limit voltage of the capacitor; and (c) setting a smallest maximum output of the calculated at least two maximum outputs as an execution maximum output of the capacitor.

The maximum output setting method of the present invention calculates at least two maximum outputs among plural maximum outputs including a maximum output due to a maximum current, which can be outputted from the capacitor, calculated on the basis of an allowable maximum current of the capacitor from an open-circuit voltage, an internal resistance, and an allowable lower limit voltage of the capacitor set on the basis of at least a voltage, an electric current, and a temperature included in a state of the capacitor, a maximum output due to an open-circuit voltage, which can be outputted from the capacitor, calculated on the basis of the open-circuit voltage of the capacitor and an open-circuit lower limit voltage applied to the capacitor, and a maximum output due to a capacitor voltage, which can be outputted from the capacitor, calculated on the basis of the voltage and the allowable lower limit voltage of the capacitor. The maximum output setting method sets a smallest maximum output of the calculated at least two maximum outputs as an execution maximum output of the capacitor. In other words, the maximum output setting method calculates at least two maximum outputs among plural maximum outputs including a maximum output due to a maximum current, a maximum output due to an open-circuit voltage, and a maximum output due to a capacitor voltage and sets a smallest maximum output of the calculated at least two maximum outputs as an execution maximum output of the capacitor. This makes it possible to more properly set the execution maximum output of the capacitor.

In one preferable embodiment of the maximum output setting method of the present invention, the step (b) is a step of performing at least two calculations among plural calculations of a maximum output including a calculation for setting an electric current obtained by dividing a difference between the calculated open-circuit voltage and the allowable lower limit voltage by the calculated internal resistance as the maximum current and setting an output calculated by multiplying the maximum current with the allowable lower limit voltage as the maximum output due to a maximum current, a calculation for setting an output calculated by dividing a difference between a square of the calculated open-circuit voltage and a square of the open-circuit lower limit voltage by the calculated internal resistance as the maximum output due to an open-circuit voltage, and a calculation for setting an output calculated by dividing a difference between a square of the voltage of the capacitor and a square of the allowable lower limit voltage by the calculated internal resistance as the maximum output due to the capacitor voltage. This makes it possible to more properly calculate the maximum output due to a maximum current, the maximum output due to an open-circuit voltage, and the maximum output due to a capacitor voltage.

BEST MODE FOR CARRYING OUT THE INVENTION

Figure 1:
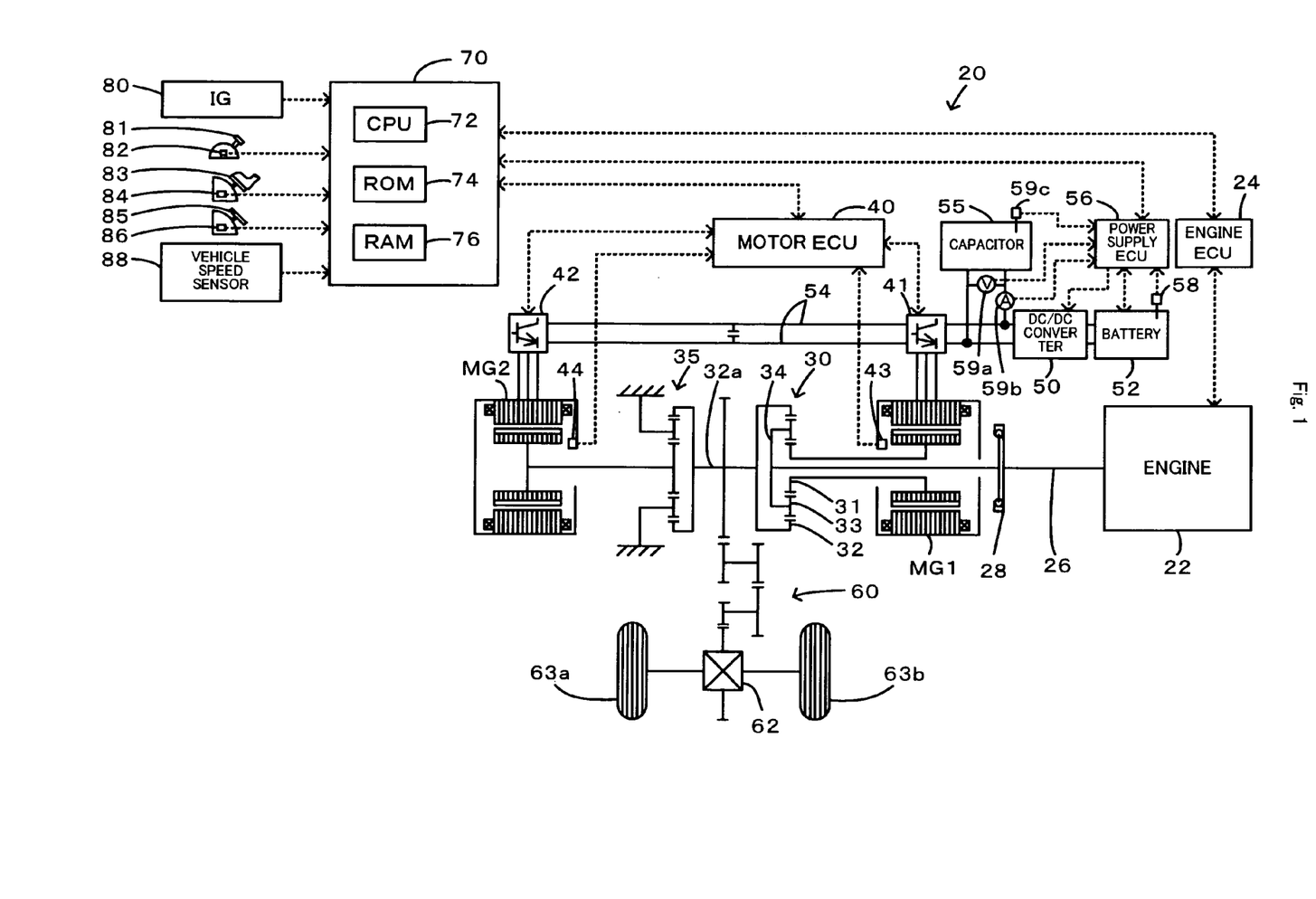
FIG. 1 is a diagram showing a schematic structure of a hybrid vehicle 20 mounted with a power output apparatus according to an embodiment of the present invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution and integration mechanism 30 that is linked with a crankshaft 26 functioning as an output shaft of the engine 22 via a damper 28, a motor MG1 that is linked with the power distribution and integration mechanism 30 and is capable of generating electric power, a reduction gear 35 that is attached to a ring gear shaft 32a functioning as a drive shaft connected with the power distribution and integration mechanism 30, another motor MG2 that is linked with the reduction gear 35, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a DC/DC converter 50 (battery 52) or a capacitor 55 via inverters 41 and 42. Power lines 54 that connect the inverters 41 and 42 with the DC/DC converter 50, and the capacitor 55 are constructed as a positive electrode bus line and a negative electrode bus line shared by the inverters 41 and 42. This arrangement enables the electric power generated by one of the motors MG1 and MG2 to be consumed by the other motor. The battery 52 and capacitor 55 are charged with a surplus of the electric power generated by the motor MG1 or MG2 and is discharged to supplement an insufficiency of the electric power. When the power balance is attained between the motors MG1 and MG2, the battery 52 and capacitor 55 are neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The DC/DC converter 50, the battery 52, and the capacitor 55 are managed by a power supply electronic control unit (hereinafter referred to as power supply ECU) 56. The power supply ECU 56 receives signals necessary for managing the battery 52, for example, an inter-terminal voltage Vb from a not-shown voltage sensor located between the terminals of the battery 52, a charge-discharge current Ib from a not-shown current sensor attached to the output terminal of the battery 52, and a battery temperature Tb from a temperature sensor 58 attached to the battery 52. The power supply ECU 56 also receives signals necessary for managing the capacitor 55, for example, a capacitor voltage Vcap from a voltage sensor 59a located between the terminals of the capacitor 55, a capacitor current Icap from a current sensor 59b attached to the output terminal of the capacitor 55, and a capacitor temperature Tcap from a temperature sensor 59c attached to the capacitor 55. The power supply ECU 56 outputs a switching control signal and the like to the switching element of the DC/DC converter 50. The power supply ECU 56 communicates with a hybrid electronic control unit 70. The power supply ECU 56 drives and controls the DC/DC converter 50 according to a control signal from the hybrid electronic control unit 70 and outputs, when necessary, data concerning a state of the battery 52 and a state of the capacitor 55 to the hybrid electronic control unit 70 through the communication. The power supply ECU 56 also calculates a state of charge (SOC) of the battery 52 on the basis of an integrated value of the charge-discharge current Ib detected by the current sensor.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the power supply ECU 56 via the communication port to transmit diverse control signals and data to and from the engine ECU 24, the motor ECU 40, and the power supply ECU 56, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution and integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging or discharging the battery 52 and capacitor 55, while driving and controlling the motors MG1 and MG2 to cause all or part of the power output from the engine 22 equivalent to the required level of power to be subjected to torque conversion by means of the power distribution and integration mechanism 30 and the motors MG1 and MG2 and output to the ring gear shaft 32a, simultaneously with charge or discharge of the battery 52 and capacitor 55. The motor drive mode stops the operations of the engine 22 and drives and controls the motor MG2 to output a quantity of power equivalent to the required level of power to the ring gear shaft 32a.

Figure 2:
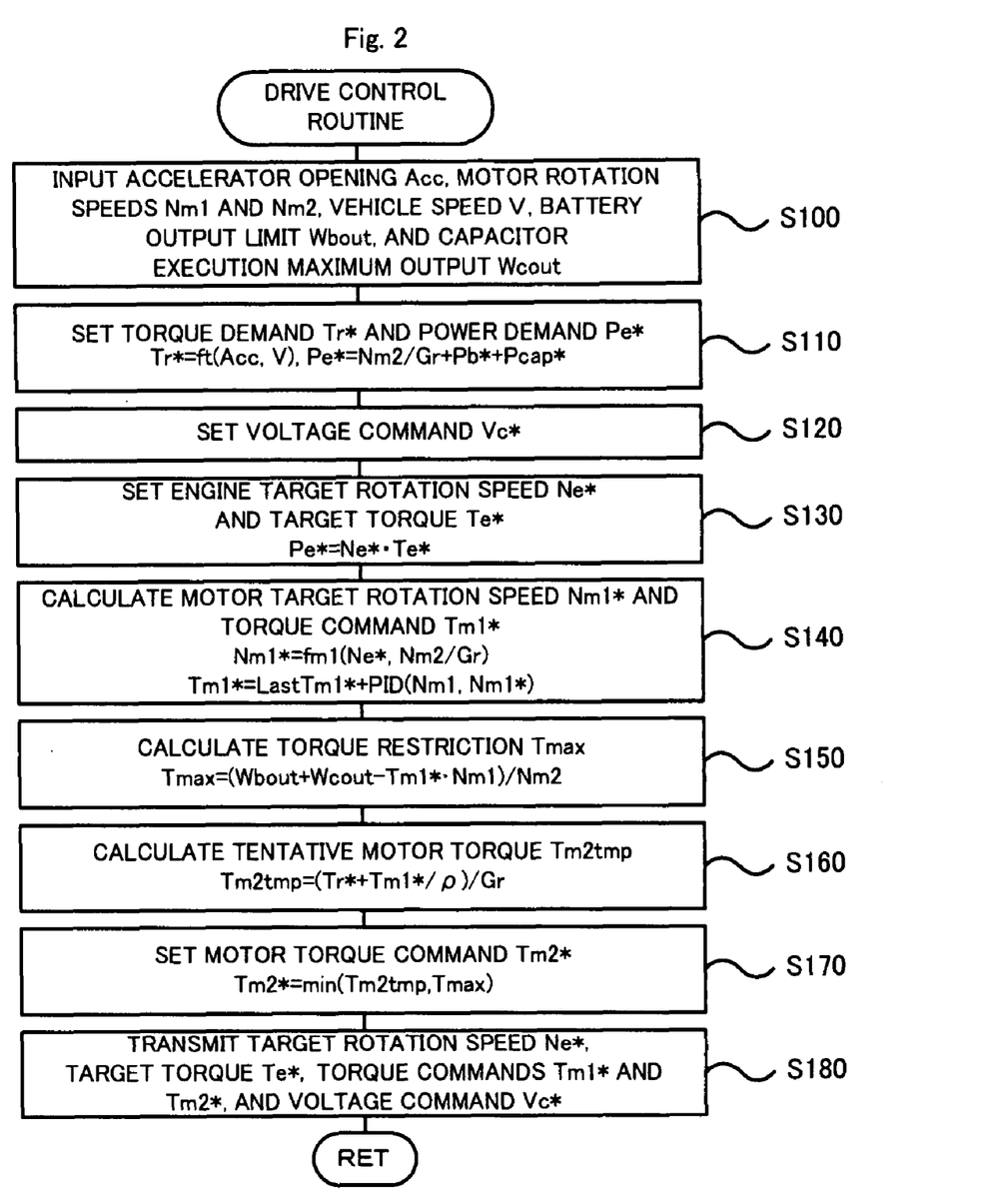
FIG. 2 is a flowchart showing an example of a drive control routine executed by a hybrid electronic control unit 70 according to the embodiment.

Operations of the hybrid vehicle 20 constituted as described above will be explained. FIG. 2 is a flowchart showing an example of a drive and control routine executed by the hybrid electronic control unit 70. This routine is repeatedly executed every predetermined time (e.g., every several msec).

Figure 3:
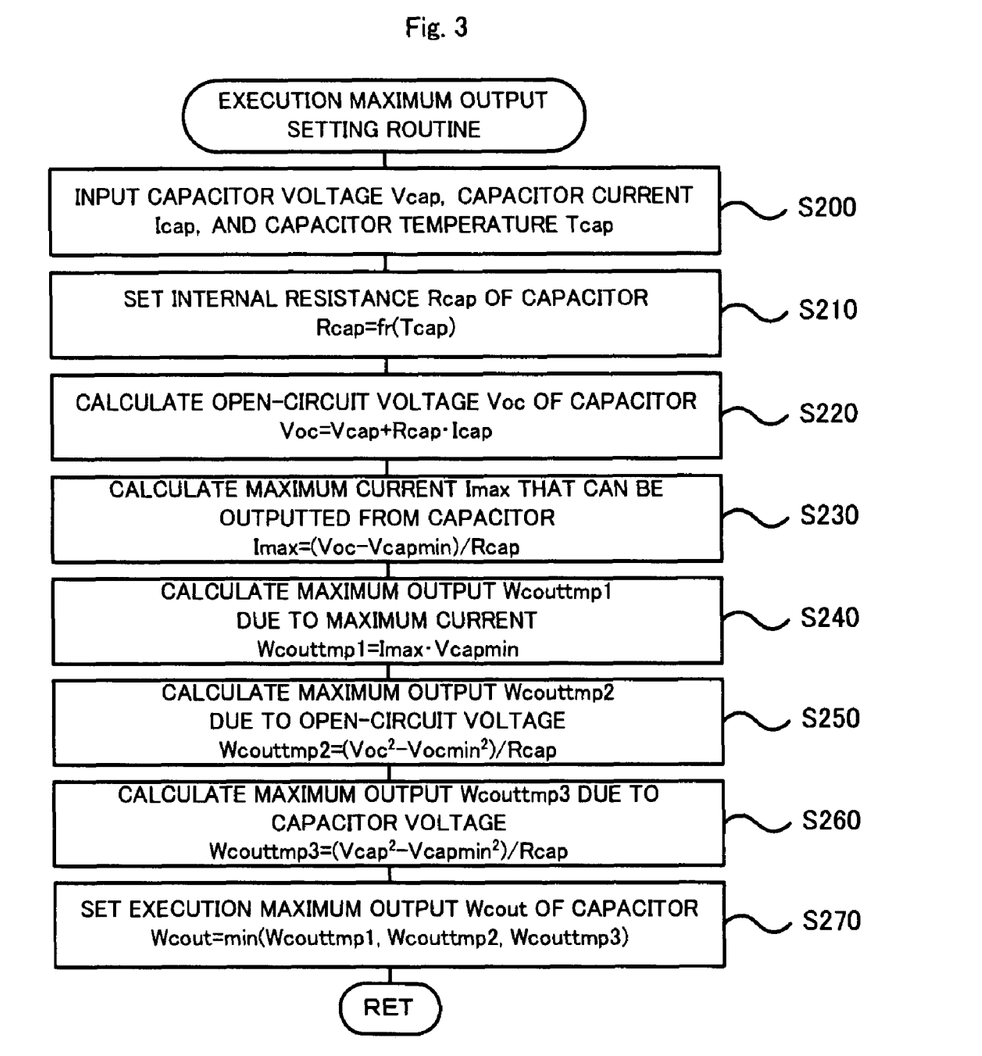
FIG. 3 is a flowchart showing an example of an execution maximum output setting routine executed by a power supply ECU 56 according to the embodiment.

When the drive control routine is executed, first, the CPU 72 of the hybrid electronic control unit 70 executes processing for inputting data necessary for control such an accelerator opening Acc from the accelerator pedal position sensor 84, vehicle speed V from the vehicle speed sensor 88, rotation speeds Nm1 and Nm2 of the motors MG1 and MG2, an output limit Wbout of the battery 52, and an execution maximum output Wcout of the capacitor 55 (step S100). As the rotation speeds Nm1 and Nm2 of the motors MG1 and MG2, rotation speeds calculated on the basis of rotational positions of rotors of the motors MG1 and MG2 detected by the rotational position detection sensors 43 and 44 are inputted from the motor ECU 40 through communication. As the output limit Wbout of the battery 52, an output limit set on the basis of the battery temperature Tb of the battery 52 detected by the temperature sensor 58 and the state of charge (SOC) of the battery 52 is inputted from the power supply ECU 56 through communication. Moreover, as the execution maximum output Wcout of the capacitor 55, a maximum output set by a execution maximum output setting routine shown in FIG. 3 is inputted from the power supply ECU 56 through communication. The explanation of the drive control routine in FIG. 2 is temporarily suspended and the execution maximum output setting routine in FIG. 3 executed by the power supply ECU 56 will be explained. This execution maximum output setting routine is repeatedly executed every predetermined time (e.g., every several msec) in the same manner as the drive control routine.

Figure 4:
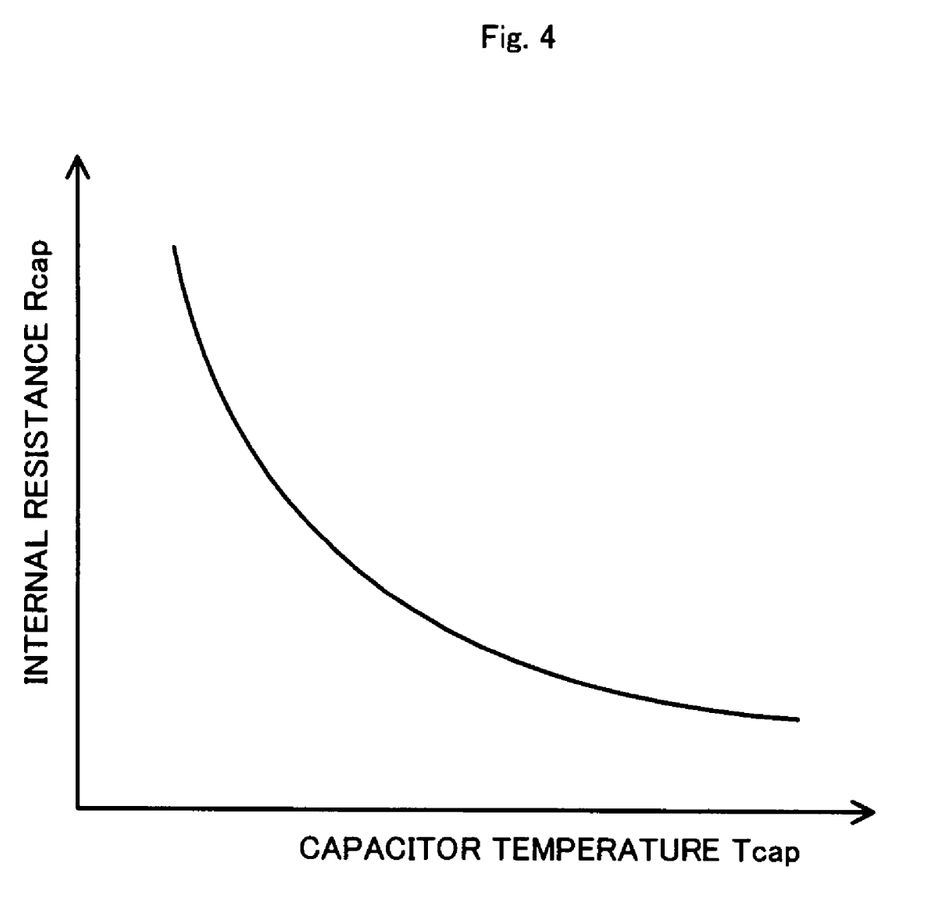
FIG. 4 is an explanatory diagram showing an example of a map for setting an internal resistance.

When the execution maximum output setting routine is executed, first, a not-shown CPU of the power supply ECU 56 inputs data necessary for control such as a capacitor voltage Vcap from the voltage sensor 59a, a capacitor current Icap from the current sensor 59b, and a capacitor temperature Tcap from the temperature sensor 59c (step S200). The CPU sets an internal resistance Rcap of the capacitor 55 on the basis of the inputted capacitor temperature Tcap (step S210) and calculates an open-circuit voltage Voc of the capacitor 55 (step S220). In this embodiment, a relation between the capacitor temperature Tcap and the internal resistance Rcap is determined in advance and stored in a not-shown ROM in the form of a map for setting an internal resistance and, when the capacitor temperature Tcap is given, the CPU derives the internal resistance Rcap corresponding to the capacitor temperature Tcap from the stored map and sets the internal resistance Rcap. An example of the map for setting an internal resistance is shown in FIG. 4. As shown in the figure, the internal resistance Rcap is set to be smaller as the capacitor temperature Tcap is higher. The open-circuit voltage Voc of the capacitor 55 can be calculated by the following equation (1) on the basis of the capacitor voltage Vcap, the capacitor current Icap, and the internal resistance Rcap.

$$Voc = Vcap + Icap \cdot Rcap \qquad (1)$$

Subsequently, the CPU calculates a maximum current Imax of the capacitor 55 by dividing a difference between the calculated open-circuit voltage Voc of the capacitor 55 and an allowable lower limit voltage Vcapmin allowed for the capacitor 55 by the internal resistance Rcap (step S230). The CPU calculates a maximum output Wcouttmp1 due to a maximum current, which can be outputted from the capacitor 55, by multiplying the calculated maximum current Imax with the allowable lower limit voltage Vcapmin (step S240). The CPU calculates a maximum output Wcouttmp2 due to an open-circuit voltage, which can be outputted from the capacitor 55, by dividing a difference between the square of the open-circuit voltage Voc and the square of an open-circuit lower limit voltage Vocmin applied as a lower limit of an open-circuit voltage of the capacitor 55 by the internal resistance Rcap (step S250). The CPU calculates a maximum output Wcouttmp3 due to a capacitor voltage, which can be outputted from the capacitor 55, by dividing a difference between the square of the capacitor voltage Vcap and the square of the allowable lower limit voltage Vcapmin by the internal resistance Rcap (step S260). The CPU sets a smallest maximum output among the maximum output Wcouttmp1 due to a maximum current, the maximum output Wcouttmp2 due to an open-circuit voltage, and the maximum output Wcouttmp3 due to a capacitor voltage as an execution maximum output Wcout of the capacitor 55 (step S270). The CPU finishes the execution maximum output setting routine. In this way, the three maximum outputs Wcouttmp1, Wcouttmp2, and Wcouttmp3 are calculated and a smallest maximum output among the calculated three maximum outputs Wcouttmp1, Wcouttmp2, and Wcouttmp3 is set as the execution maximum output Wcout of the capacitor 55. Therefore, compared with the execution maximum output Wcout of the capacitor 55 set on the basis of only a maximum output calculated by one calculation method, it is possible to more properly set the execution maximum output Wcout.

Figure 5:
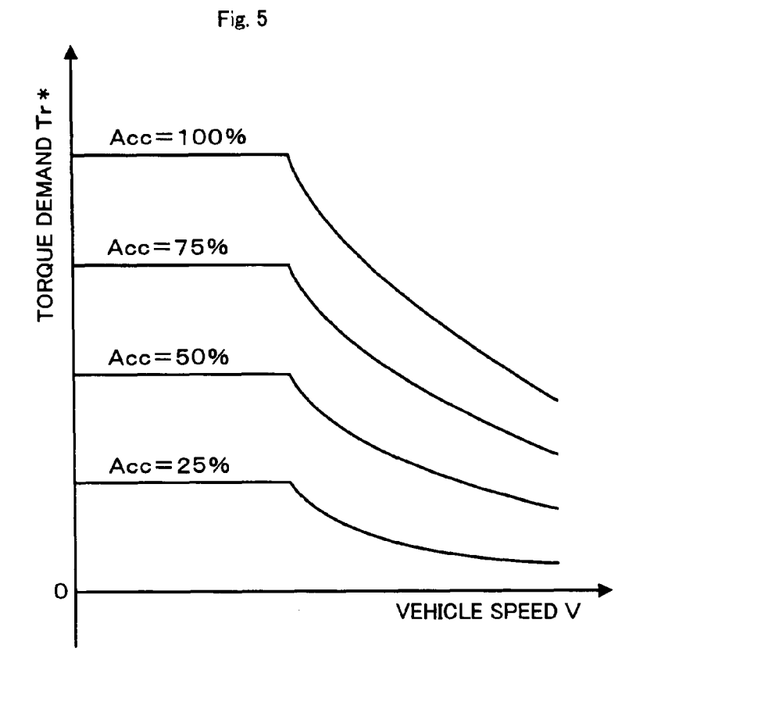
FIG. 5 is an explanatory diagram showing an example of a map for setting a torque demand.

Returning to the explanation of the drive control routine in FIG. 2, when the CPU 72 inputs the data in step S100, the CPU 72 sets, on the basis of the accelerator opening Acc and the vehicle speed V inputted, a torque demand Tr*, which should be outputted to the ring gear shaft 32a as the drive shaft coupled to the drive wheels 63a and 63b, as torque required of the vehicle and sets a power demand Pe* required of the engine 22 (step S110). In this embodiment, a relation among the accelerator opening Acc, the vehicle speed V, and the torque demand Tr* is determined in advance and stored in the ROM 74 in the form of a map for setting a torque demand and, when the accelerator opening Acc and the vehicle speed V are given, the CPU 72 derives the torque demand Tr* corresponding to the accelerator opening Acc and the vehicle speed V from the stored map and sets the torque demand Tr*. An example of the map for setting a torque demand is shown in FIG. 5. The power demand Pe* can be calculated by multiplying the set torque demand Tr* with rotation speed Nr of the ring gear shaft 32a and adding a charge-discharge power demand Pb* of the battery 52 and a charge-discharge power demand Pcap* of the capacitor 55 to the torque demand Tr* multiplied with the rotation speed Nr. The rotation speed Nr of the ring gear shaft 32a can be calculated by multiplying the vehicle speed V with a conversion coefficient k or dividing the rotation speed Nm2 of the motor MG2 by a gear ratio Gr of the reduction gear 35. As the charge-discharge power demand Pb* of the battery 52, a charge-discharge power demand set on the basis of the state of charge (SOC) and the like of the battery 52 is inputted from the power supply ECU 56. As the charge-discharge power demand Pcap* of the capacitor 55, a charge-discharge power demand set on the basis of the open-circuit voltage Voc and the like of the capacitor 55, which are calculated by the execution maximum output setting routine in FIG. 3, is inputted from the power supply ECU 56.

Figure 6:
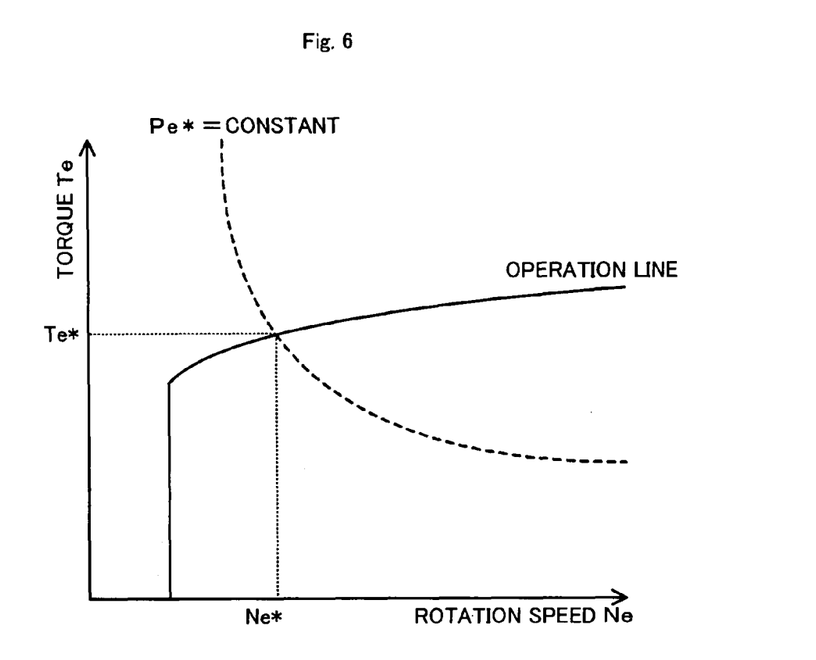
FIG. 6 is an explanatory diagram showing an example of an operation line of an engine 22 and a state of setting of target rotation speed Ne* and target torque Te*.

Subsequently, the CPU 72 sets a voltage command Vc* of the DC/DC converter 50 on the basis of the charge-discharge power demand Pcap* of the capacitor 55 (step S120) and sets target rotation speed Ne* and target torque Te* of the engine 22 on the basis of the power demand Pe* (step S130). In this setting, the target rotation speed Ne* and the target torque Te* are set on the basis of an operation line for efficient operation of the engine 22 and the power demand Pe*. An example of the operation line of the engine 22 and a state of setting of the target rotation speed Ne* and the target torque Te* are shown in FIG. 6. As shown in the figure, the target rotation speed Ne* and the target torque Te* can be calculated according to a point of intersection of the operation line and a curve with a fixed power demand Pe*(Ne*×Te*).

Figure 7:
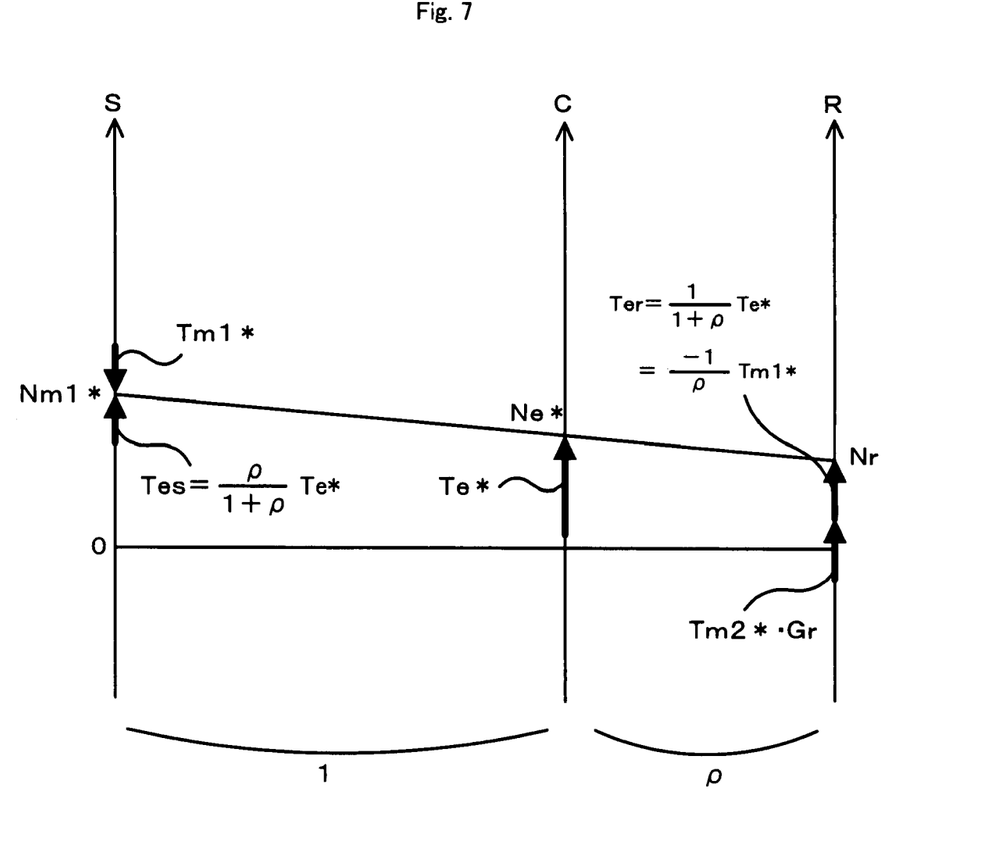
FIG. 7 is an explanatory diagram showing an example of an alignment chart for dynamically explaining rotation elements of a power distribution and integration mechanism 30.

The CPU 72 calculates target rotation speed Nm1* of the motor MG1 according to the following Equation (2) using the set target rotation speed Ne*, rotation speed Nr (=Nm2/Gr) of the ring gear shaft 32a, and a gear ratio ρ of the power distribution and integration mechanism 30 and calculates a torque command Tm1* of the motor MG1 according to Equation (3) on the basis of the calculated target rotation speed Nm1* and the present rotation speed Nm1 (step S140). Equation (2) is a dynamic relational expression with respect to rotation elements of the power distribution and integration mechanism 30. An alignment chart indicating a dynamic relation between rotation speed and torque in the rotation elements of the power distribution and integration mechanism 30 is shown in FIG. 7. In the figure, an S axis on the left indicates rotation speed of the sun gear 31, which is the rotation speed Nm1 of the motor MG1. A C axis indicates rotation speed of the carrier 34, which is the rotation speed Ne of the engine 22. An R axis indicates the rotation speed Nr of the ring gear 32 obtained by dividing the rotation speed Nm2 of the motor MG2 by the gear ratio Gr of the reduction gear 35. Equation (2) can be easily derived using this alignment chart. Two bold line arrows on the R axis indicate torque Te* outputted from the engine 22 at the time of steady operation of the engine 22 at an operation point of the target rotation speed Ne* and the target torque Te* and transmitted to the ring gear shaft 32a and torque Tm2* outputted from the motor MG2 and acting on the ring gear shaft 32a via the reduction gear 35. Equation (3) is a relational expression in feedback control for rotating the motor MG1 at the target rotation speed Nm1*. In Equation (3), "k1" in a second term on the right side is a gain of a proportional term and "k2" in a third term on the right side is a gain of an integration term.

$$Nm1^* = Ne^* \cdot (1+\rho)/\rho - Nm2/(Gr \cdot \rho) \quad (2)$$

$$Tm1^* = \text{last } Tm1^* + k1(Nm1^* - Nm1) + k2\int(Nm1^* - Nm1)dt \quad (3)$$

When the target rotation speed Nm1* and the torque command Tm1* of the motor MG1 is calculated in this way, the CPU 72 calculates, according to the following Equation (4), a torque restriction Tmax as an upper limit of torque, which may be outputted from the motor MG2, by dividing a deviation between the amount of the output limit Wbout of the battery 52 and the execution maximum output Wcout of the capacitor 55, and power consumption (generated power) of the motor MG1, which is obtained by multiplying the calculated torque command Tm1* of the motor MG1 with the present rotation speed Nm1 of the motor MG1, by the rotation speed Nm2 of the motor MG2 (step S150). The CPU 72 calculates, according to Equation (5), tentative motor torque Tm2tmp as torque that should be outputted from the motor MG2 using the torque demand Tr*, the torque command Tm1*, and the gear ratio ρ of the power distribution and integration mechanism 30 (step S160). The CPU 72 sets the torque command Tm2* of the motor MG2 as a value obtained by limiting the tentative motor torque Tm2tmp with the calculated torque restrictions Tmin and Tmax (step S170). By setting the torque command Tm2* of the motor MG2 in this way, it is possible to set the torque demand Tr*, which is outputted to the ring gear shaft 32a serving as the drive shaft, as torque restricted in a range of the output limit Wbout of the battery 52 and the execution maximum output Wcout of the capacitor 55. Further, as described above, it is possible to more properly set the execution maximum output Wcout of the capacitor 55. Therefore, by setting the torque command Tm2* of the motor MG2 in this way, it is possible to prevent excessive electric power from being outputted from the capacitor 55. Equation (5) can be easily derived from the alignment chart in FIG. 7.

$$T\max = (Wbout + Wcout - Tm1^* \cdot Nm1)/Nm2 \quad (4)$$

$$Tm2tmp = (Tr^* + Tm1^*/\rho)/Gr \quad (5)$$

When the target rotation speed Ne* and the target torque Te* of the engine 22, the torque commands Tm1* and Tm2* of the motors MG1 and MG2, and the voltage command Vc* of the DC/DC converter 50 are set in this way, the CPU 72 transmits the target rotation speed Ne* and the target torque Te* of the engine 22, the torque commands Tm1* and Tm2* of the motors MG1 and MG2, and the voltage command Vc* of the DC/DC converter 50 to the engine ECU 24, the motor ECU 40, and the power supply ECU 56, respectively (step S180) and finishes the drive control routine. The engine ECU 24, which has received the target rotation speed Ne* and the target torque Te*, performs control such as fuel injection control and ignition control in the engine 22 such that the engine 22 is operated at an operation point indicated by the target rotation speed Ne* and the target torque Te*. The motor ECU 40, which has received the torque commands Tm1* and Tm2*, performs switching control for switching elements of the inverters 41 and 42 such that the motor MG1 is driven at the torque command Tm1* and the motor MG2 is driven with the torque command Tm2*. The power supply ECU 56, which has received the voltage command Vc*, performs switching control for a switching element of the DC/DC converter 50 such that a voltage acting on the power line 54 reaches the voltage command Vc*.

In the hybrid vehicle 20 according to the embodiment explained above, the internal resistance Rcap and the open-circuit voltage Voc of the capacitor 55 are set on the basis of the capacitor voltage Vcap, the capacitor current Icap, and the capacitor temperature Tcap and the maximum current Imax is calculated on the basis of the set open-circuit voltage Voc and the lower limit voltage Vcapmin and the internal resistance Rcap of the capacitor 55. The maximum output Wcouttmp1 due to a maximum current is calculated on the basis of the calculated maximum current Imax and the lower limit voltage Vcapmin. The maximum output Wcouttmp2 due to an open-circuit voltage is calculated on the basis of the open-circuit voltage Voc, the open-circuit lower limit voltage Vocmin, and the internal resistance Rcap. The maximum output Wcouttmp3 due to a capacitor voltage is calculated on the basis of the capacitor voltage Vcap, the lower limit voltage Vcapmin, and the internal resistance Rcap. A smallest maximum output among the calculated maximum outputs Wcouttmp1, Wcouttmp2, and Wcouttmp3 is set as the execution maximum output Wcout of the capacitor 55. Therefore, it is possible to more properly calculate the execution maximum output Wcout of the capacitor 55. Moreover, since the motors MG1 and MG2 are controlled to be driven within ranges of the execution maximum output Wcout set in this way and the output limit Wbout of the battery 52, it is possible to prevent excessive electric power from being outputted from the capacitor 55.

In the hybrid vehicle 20 according to the embodiment, the maximum output Wcouttmp1 due to a maximum current, the maximum output Wcouttmp2 due to an open-circuit voltage, and the maximum output Wcouttmp3 due to a capacitor voltage are calculated and a smallest maximum output among the three calculated maximum outputs Wcouttmp1, Wcouttmp2, and Wcouttmp3 is set as the execution maximum output Wcout of the capacitor 55. However, at least two maximum outputs among plural maximum outputs including the maximum output Wcouttmp1 due to a maximum current, the maximum output Wcouttmp2 due to an open-circuit voltage, and the maximum output Wcouttmp3 due to a capacitor voltage only have to be calculated and a smallest maximum output of the calculated at least two maximum outputs only has to be set as the execution maximum output Wcout of the capacitor 55. For example, any one of the maximum output Wcouttmp1 due to a maximum current, the maximum output Wcouttmp2 due to an open-circuit voltage, and the maximum output Wcouttmp3 due to a capacitor voltage does not have to be calculated. In other words, any two maximum outputs among the maximum output Wcouttmp1 due to a maximum current, the maximum output Wcouttmp2 due to an open-circuit voltage, and the maximum output Wcouttmp3 due to a capacitor voltage may be calculated and a smallest maximum output of the calculated two maximum outputs may be set as the execution maximum output Wcout of the capacitor 55. Further, four or more maximum outputs including the maximum output Wcouttmp1 due to a maximum current, the maximum output Wcouttmp2 due to an open-circuit voltage, and the maximum output Wcouttmp3 due to a capacitor voltage may be calculated and a smallest maximum output among the calculated maximum outputs may be set as an execution maximum output of the capacitor 55.

In the hybrid vehicle 20 according to the embodiment, the drive control routine is executed by the hybrid electronic control unit 70 and the execution maximum output setting routine is executed by the power supply ECU 56. However, the execution maximum output setting routine may be executed by the hybrid electronic control unit 70.

The hybrid vehicle 20 according to the embodiment includes the capacitor 55 and the battery 52. However, the hybrid vehicle 20 may include only the capacitor 55 and does not have to include the battery 52.

Figure 8:
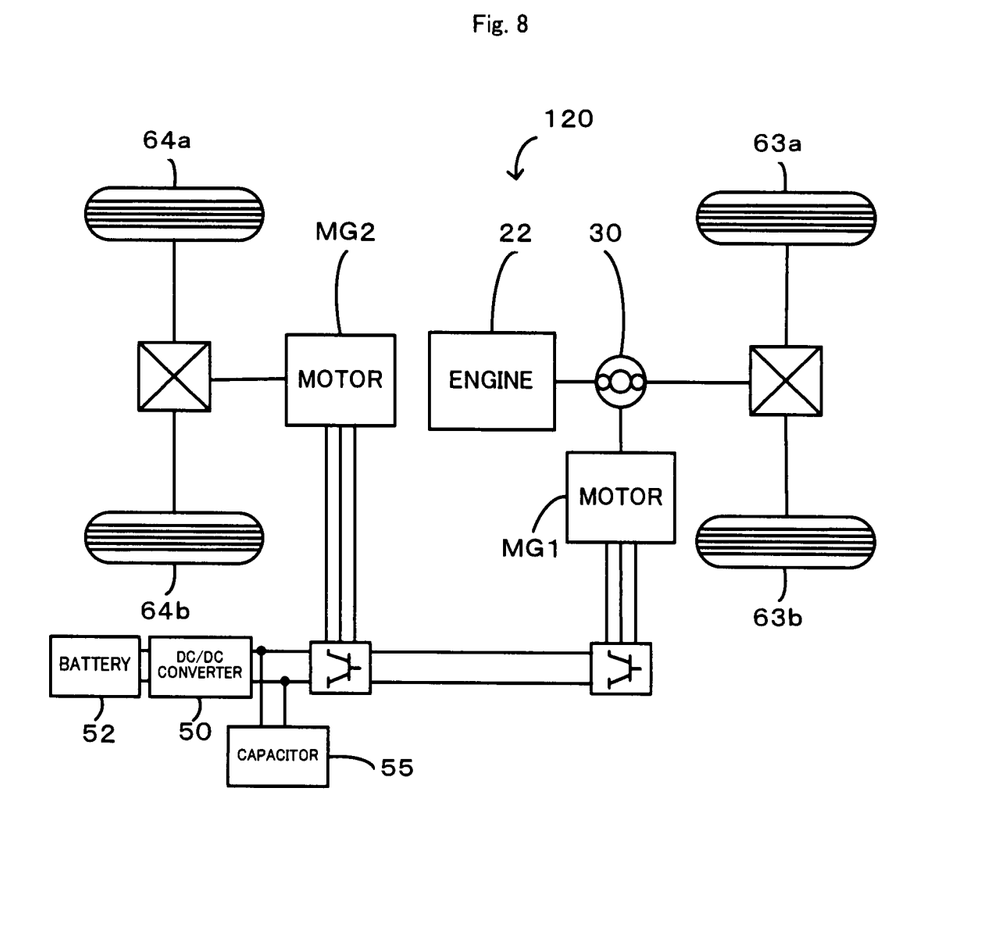
FIG. 8 is a diagram showing a schematic structure of a hybrid vehicle 120 according to a modification.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 8, the power of the motor MG2 may be output to another axle (that is, an axle linked with wheels 64a and 64b), which is different from an axle connected with the ring gear shaft 32a (that is, an axle linked with the wheels 63a and 63b).

Figure 9:
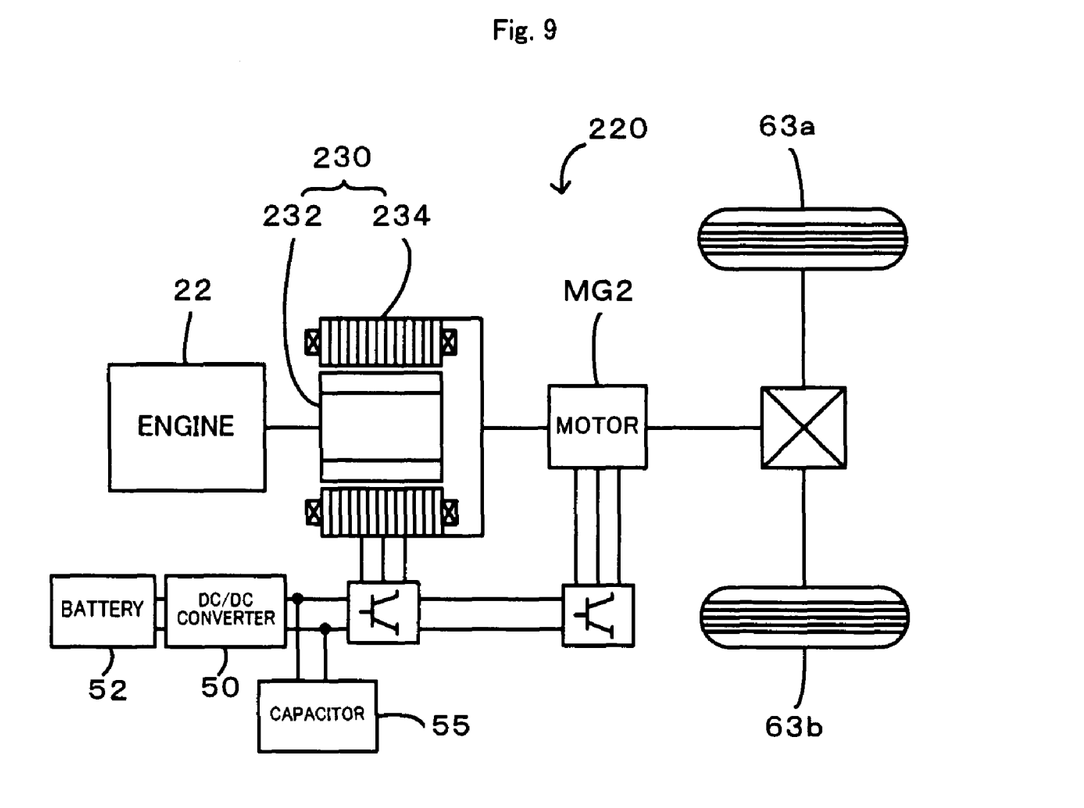
FIG. 9 is a diagram showing a schematic structure of a hybrid vehicle 220 according to a modification.

In the hybrid vehicle 20 of the embodiment, the power of the engine 22 is output via the power distribution and integration mechanism 30 to the ring gear shaft 32a functioning as the drive shaft linked with the drive wheels 63a and 63b. In another possible modification of FIG. 9, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

In the embodiment, the hybrid vehicle 20 mounted with the power output apparatus including the engine 22, the power distribution and integration mechanism 30, the motors MG1 and MG2, the battery 52, and the capacitor 55 is explained. However, such a power output apparatus may be mounted on mobile bodies such as vehicles other than motor vehicles, as well as ships, and airplanes or may be built in building equipment and the like other than the mobile bodies. Further, the present invention may be used in the form of a power output apparatus and a form of a control method for the power output apparatus. Moreover, the present invention may be used in the form of a driving device including a motor, a battery, and a capacitor and a form of a control method for the driving device. Alternatively, the present invention may be used in the form of a maximum output setting device that sets a maximum output of the capacitor and a form of a maximum output setting method of setting a maximum output of the capacitor.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The invention claimed is:

1. A maximum output setting device that sets a maximum output of a capacitor, the maximum output setting device comprising:
 a state detecting unit that detects a state of the capacitor including a voltage, an electric current, and temperature of the capacitor;
 a voltage-resistance calculating unit that calculates an open-circuit voltage and an internal resistance of the capacitor on the basis of at least the voltage, the electric current, and the temperature included in the state of the capacitor detected;
 a maximum-output calculating unit that calculates three maximum outputs including a maximum output due to a maximum current, which can be outputted from the capacitor, calculated on the basis of an allowable maximum current of the capacitor from the open-circuit voltage and the internal resistance calculated and an allowable lower limit voltage of the capacitor, a maximum output due to an open-circuit voltage, which can be outputted from the capacitor, calculated on the basis of the open-circuit voltage calculated and an open-circuit lower limit voltage applied to the capacitor, and a maximum output due to a capacitor voltage, which can be outputted from the capacitor, calculated on the basis of the voltage of the capacitor detected and the allowable lower limit voltage of the capacitor; and
 an execution maximum output setting unit that sets a smallest maximum output of the calculated three maximum outputs as an execution maximum output of the capacitor; and
 wherein the maximum-output calculating unit is a unit that performs three calculations of a maximum output including a calculation for setting an electric current obtained by dividing a difference between the calculated open-circuit voltage and the allowable lower limit voltage by the calculated internal resistance as the maximum current and setting an output calculated by multiplying the maximum current with the allowable lower limit voltage as the maximum output due to a maximum current, a calculation for setting an output calculated by dividing a difference between a square of the calculated open-circuit voltage and a square of the open-circuit lower limit voltage by the calculated internal resistance as the maximum output due to an open-circuit voltage, and a calculation for setting an output calculated by dividing a difference between a square of the detected voltage of the capacitor and a square of the allowable lower limit voltage by the calculated internal resistance as the maximum output due to the capacitor voltage.

2. A maximum output setting device according to claim 1, wherein the voltage-resistance calculating unit is a unit that sets the internal resistance of the capacitor to be smaller as the detected temperature of the capacitor is higher and calculates the open-circuit voltage of the capacitor on the basis of the internal resistance set and the detected voltage and electric current of the capacitor.

3. A driving device that drives a drive shaft, the driving device comprising:
 a motor that is capable of inputting power to and outputting power from the drive shaft;
 a capacitor that is capable of exchanging electric power with the motor;
 an accumulator unit that is capable of exchanging electric power with the motor and is connected in parallel to the capacitor with respect to the motor;
 a state detecting unit that detects a state of the capacitor including a voltage, an electric current, and temperature of the capacitor;
 a voltage-resistance calculating unit that calculates an open-circuit voltage and an internal resistance of the capacitor on the basis of at least the voltage, the electric current, and the temperature included in the state of the capacitor detected;
 a maximum-output calculating unit that calculates three maximum outputs including a maximum output due to a maximum current, which can be outputted from the capacitor, calculated on the basis of an allowable maximum current of the capacitor from the open-circuit voltage and the internal resistance calculated and an allowable lower limit voltage of the capacitor, a maximum output to an open-circuit voltage, which can be outputted from the capacitor, calculated on the basis of the open-circuit voltage calculated and an open-circuit lower limit voltage applied to the capacitor, and a maximum output due to a capacitor voltage, which can be outputted from the capacitor, calculated on the basis of the voltage of the capacitor detected and the allowable lower limit voltage of the capacitor;

an execution maximum output setting unit that sets a smallest maximum output of the calculated three maximum outputs as an execution maximum output of the capacitor;

a driving-power-demand setting unit that sets a driving power demand required of the drive shaft; and a control unit that controls the motor such that a driving force based on the driving power demand set is outputted to the drive shaft and is outputted from the capacitor in a range of the execution maximum output of the capacitor set.

4. A power output apparatus that outputs power to a drive shaft, the power output apparatus comprising:

an internal combustion engine that is capable of outputting power to the drive shaft;

a motor that is capable of inputting power to and outputting power from the drive shaft;

a capacitor that is capable of exchanging electric power with the motor;

an accumulator unit that is capable of exchanging electric power with the motor and is connected in parallel to the capacitor with respect to the motor;

a state detecting unit that detects a state of the capacitor including a voltage, an electric current, and temperature of the capacitor;

a voltage-resistance calculating unit that calculates an open-circuit voltage and an internal resistance of the capacitor on the basis of at least the voltage, the electric current, and the temperature included in the state of the capacitor detected;

a maximum-output calculating unit that calculates three maximum outputs including a maximum output due to a maximum current, which can be outputted from the capacitor, calculated on the basis of an allowable maximum current of the capacitor from the open-circuit voltage and the internal resistance calculated and an allowable lower limit voltage of the capacitor, a maximum output due to an open-circuit voltage, which can be outputted from the capacitor, calculated on the basis of the open-circuit voltage calculated and an open-circuit lower limit voltage applied to the capacitor, and a maximum output due to a capacitor voltage, which can be outputted from the capacitor, calculated on the basis of the voltage of the capacitor detected and the allowable lower limit voltage of the capacitor;

an execution maximum output setting unit that sets a smallest maximum output of the calculated three maximum outputs as an execution maximum output of the capacitor;

a driving-power-demand setting unit that sets a driving power demand required of the drive shaft; and a control unit that controls the internal combustion engine and the motor such that a driving force based on the driving power demand set is outputted to the drive shaft and is outputted from the capacitor in a range of the execution maximum output of the capacitor set.

5. A power output apparatus according to claim 4, further comprising:

a three shaft-type power input output module that is connected to three shafts including an output shaft of the internal combustion engine, the drive shaft, and a rotating shaft and inputs power in and outputs power from the remaining shaft on the basis of power inputted to and outputted from any two shafts of the three shafts; and a generator that inputs power in and outputs power from the rotating shaft, wherein the capacitor is a capacitor that is capable of exchanging electric power with the generator and the motor, the accumulator unit is a unit that is capable of exchanging electric power with the generator and the motor and is connected in parallel to the capacitor with respect to the generator and the motor, and the control unit is a unit that controls the internal combustion engine, the generator, and the motor.

6. A motor vehicle, comprising: an internal combustion engine that is capable of outputting power to the drive shaft linked to an axle;

a motor that is capable of inputting power to an outputting power from the drive shaft;

a capacitor that is capable of exchanging electric power with the motor;

an accumulator unit that is capable of exchanging electric power with the motor and is connected in parallel to the capacitor with the respect to the motor;

a state detecting unit that detects a state of the capacitor including a voltage, an electric current, and temperature of the capacitor;

a voltage-resistance calculating unit that calculates an open-circuit voltage and an internal resistance of the capacitor on the basis of at least the voltage, the electric current, and the temperature included in the state of the capacitor detected;

a maximum-output calculating unit that calculates three maximum outputs including a maximum output due to a maximum current, which can be outputted from the capacitor, calculated on the basis of an allowable maximum current of the capacitor from the open-circuit voltage and the internal resistance calculated and an allowable lower limit voltage of the capacitor, a maximum output due to an open-circuit voltage, which can be outputted from the capacitor, calculated on the basis of the open-circuit voltage calculated and an open-circuit lower limit voltage applied to the capacitor, and a maximum output due to a capacitor voltage, which can be outputted from the capacitor, calculated on the basis of the voltage of the capacitor detected and the allowable lower limit voltage of the capacitor;

an execution maximum output setting unit that sets a smallest maximum output of the calculated three maximum outputs as an execution maximum output of the capacitor;

a driving-power-demand setting unit that sets a driving power demand required of the drive shaft; and a control unit that controls the motor such that a driving force based on the driving power demand set is outputted to the drive shaft and is outputted from the capacitor in a range of the execution maximum output of the capacitor set.

7. A maximum output setting method of setting a maximum output of a capacitor, the maximum output setting method comprising the steps of:

(a) calculating an open-circuit voltage and an internal resistance of the capacitor on the basis of at least a voltage, an electric current, and temperature included in a state of the capacitor;

(b) calculating three maximum outputs including a maximum output due to a maximum current, which can be outputted from the capacitor, calculated on the basis of an allowable maximum current of the capacitor from the open-circuit voltage and the internal resistance calculated and an allowable lower limit voltage of the capacitor, a maximum output due to an open-circuit voltage, which can be outputted from the capacitor, calculated on the basis of the open-circuit voltage calculated and an open-circuit lower limit voltage applied to the capacitor, and a maximum output due to a capacitor voltage, which can be outputted from the capacitor, calculated on the basis of the voltage of the capacitor and the allowable lower limit voltage of the capacitor; and (c) setting a smallest maximum output of the calculated three maximum outputs as an execution maximum output of the capacitor.

8. A maximum output setting method according to claim 7, wherein the step (b) is a step of performing three calculations of a maximum output including a calculation for setting an electric current obtained by dividing a difference between the calculated open-circuit voltage and the allowable lower limit voltage by the calculated internal resistance as the maximum current and setting an output calculated by multiplying the maximum current with the allowable lower limit voltage as the maximum output due to a maximum current, a calculation for setting an output calculated by dividing a difference between a square of the calculated open-circuit voltage and a square of the open-circuit lower limit voltage by the calculated internal resistance as the maximum output due to an open-circuit voltage, and a calculation for setting an output calculated by dividing a difference between a square of the voltage of the capacitor and a square of the allowable lower limit voltage by the calculated internal resistance as the maximum output due to the capacitor voltage.

* * * * *